United States Patent Office 3,772,262
Patented Nov. 13, 1973

3,772,262
PROCESS FOR RECOVERING POLYMERS FROM ORGANIC SOLUTIONS
Anacleto Clementi, Saronno, Italy, assignor to Snam Progetti, S.p.A., San Donato, Milanese, Italy
Filed Feb. 18, 1971, Ser. No. 116,490
Claims priority, application Italy, Feb. 18, 1970
20,745/70
Int. Cl. C08d 3/04, 3/06, 5/00
U.S. Cl. 260—94.7     7 Claims

ABSTRACT OF THE DISCLOSURE

The present invention provides a process for recovering polymers of conjugated diene monomers from organic solutions by means of two strippers using steam and water and effecting transfer from the first to the second stripper by a pressure differential.

---

Figure 1:
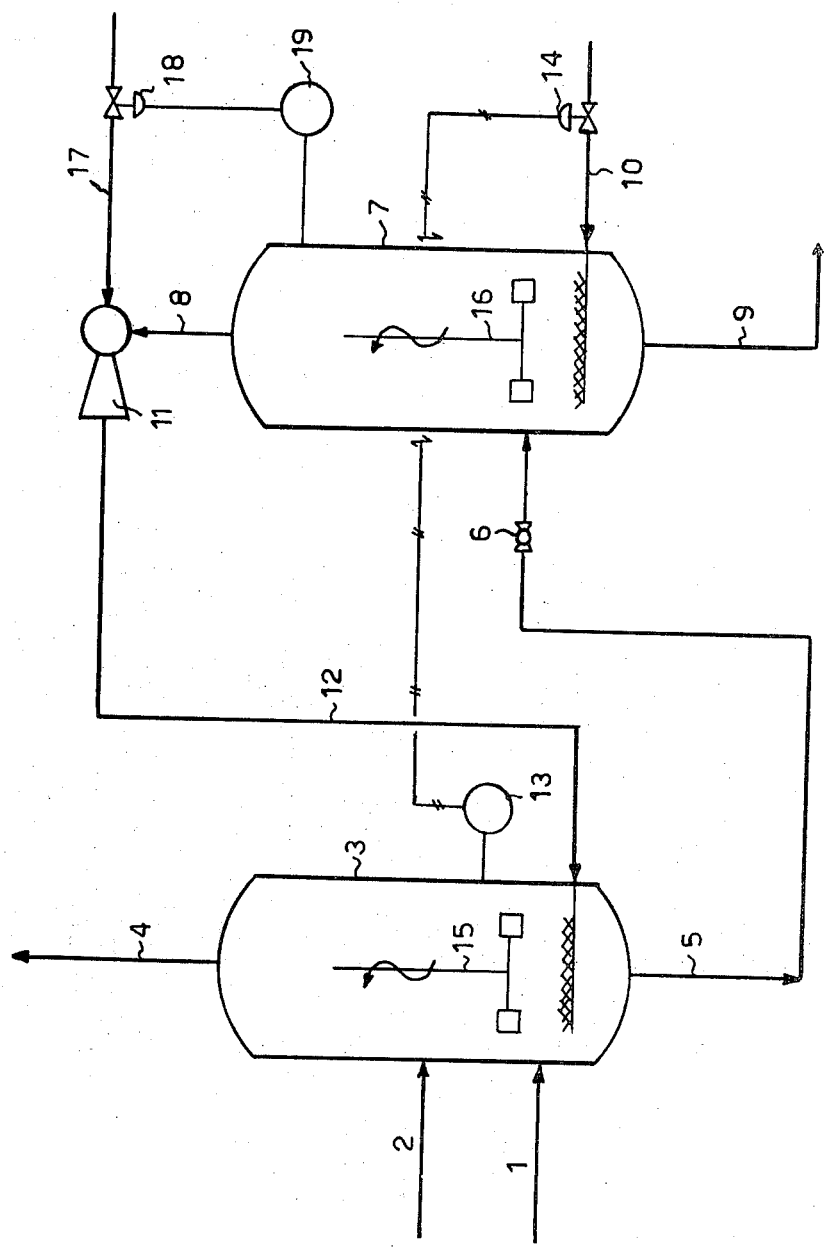

Object of the present invention is a process for recovering polymers from organic solutions.

One of the more remarkable problems in the production in solution of gummy polymers is the removal of the solvent from the gummy polymer.

The solvent is constituted in almost all cases by a hydrocarbon or a hydrocarbon fraction having a narrow boiling range; its removal has to be the more possible complete since in the subsequent finishing and drying operations serious drawbacks can be met.

The operation is carried out by stripping the solvent with live steam, leaving thereby in an aqueous suspension the polymer free of solvent and in form of crumbs.

Said simple principle has difficulties of application owing to the characteristics of the gummy polymers as polybutadiene, polyisoprene and terpolymers.

For preventing the solvent remains englobed in the crumbs which segregate during the solvent removal process and for making easier the operation of transport of the suspension to the subsequent manipulations it is necessary that the crumbs are small, while on the other hand for an easy filtration the crumbs have to be no smaller than a certain size.

For every polymer, according to the used polymerization process, to the Mooney viscosity, to the concentration of the polymer solution and to the used solvent there is a suitable combination of working conditions which allow the easiest working.

As co-operating medium of the operation use is often made of a dispersing agent, which, in aqueous solution, by acting on the surface tension, allows the crumbs even if they have englobed large solvent amounts to be wet by the water and to have a limited tendency to agglomerate.

The stirring type and the ratios between rubber, solvent and water have a remarkable influence on the operation.

Since the polymerization is carried out with a high polymer dilution, the solvent amounts to be removed are high in comparison with the produced polymer and therefore steam consumptions greatly affect the production cost.

For limiting said consumptions, according to many patent specifications, use is made of the known principle of the multiple effect evaporation, conveniently modified.

The solvent removal from the polymer is carried out in conventional processes in two steps, wherein temperatures and pressures are different, so as to make use of the steam produced in the stages at higher temperatures and pressures as a stripping medium in the stages at lower temperatures and pressures.

Said processes, especially when applied to polymers having a high tendency to agglomerate, as polyisoprene, present such application difficulties that the convenience of the multiple effect evaporation is compromised. In fact in order to obtain a polymer which can easily be transferred from one stage to the following one, it is necessary that almost the whole solvent amount be removed in the first stage, this limiting the process economy.

Still another fact has an economical importance in the multiple effect evaporation application.

Since from the first stage steam is obtained which is condensated, for avoiding plant complications said stage does not operate at pressures lower than the atmospheric one.

The second stage therefore must operate at pressures higher than the atmospheric one and there is a pressure drop during the discharge of the polymer to the filtration which is carried out at atmospheric pressure. The boiling water containing the suspension is therefore, during the filtration operation, subjected to a flash which causes the loss of the sensible heat relating to the range of boiling temperatures of the water at the two pressures, said loss being in the range of 200–300 Kcal./kg. of polymer.

Another method already known in the art foresees that the reaction mixture and the water are mixed under vigorous stirring at a pressure in the range from 7 to 35 kg./cm.$^2$ which pressure is sufficient to keep the mixture in the liquid state at the operation temperature, indirect heat being at the same time supplied to said mixture up to reach a temperature between 38 and 93° C.

Then the mixture is subjected to a flash down to relative pressure values between 0 and 1 kg./cm.$^2$; in said way the vaporized solvent together with small unreacted monomer amounts is removed from the flash zone, while the residue is formed essentially of water and polymer crumbs.

It is obvious that the flash has the purpose of removing the solvent from the mixture.

In the process according to the present invention we operate with two vessels at pressures decreasing in the direction according to which the polymeric solution flows.

Said polymeric solution is fed together with water to the first stage, provided with a stirrer; also a stream of steam containing a little solvent coming from the second stage is fed to the first stage after compression. From the top of the first stripping vessel a stream of steam, solvent and unreacted monomer is discharged, said stream being fed to the solvent recovery apparatus; a suspension of water, polymer, small amounts of solvent and not reacted monomer leaves the bottom and, given that the pressure in the first stripping apparatus is higher than in the second one, it spontaneously flows passing through an expansion valve.

In such a way a flash occurs in the second stripping apparatus, whereto also steam from the outside is fed, said steam serving the purpose of completing the solvent removal from the polymer.

A stream of steam and solvent leaves the top of the second stripping apparatus, said stream, after thermocompression, being fed as stripping medium to the bottom of the first stripping apparatus; from the bottom a mixture of water and polymer to be sent to the subsequent treatments is discharged. As far as the working conditions are concerned in the first stripping apparatus there is a temperature between 90 and 180° C., preferably between 100 and 130° C., and an absolute pressure between 1 and 5 kg./cm.$^2$, preferably between 2 and 3.2 kg./cm.$^2$.

In the second stripping apparatus there is a temperature from 80 to 140° C., preferably between 100 and 120° C. and pressures lower than the ones existing in the first stripping apparatus by 1–2 kg./cm.$^2$.

The differences and the advantages of the process according to the present invention are obvious in comparison with the cited methods already known in the art.

In comparison with the first cited method wherein use is made of the multiple effect principle the main differences are:

(1) The working pressures in the stripping apparatuses are decreasing along the flow of the polymer crumbs.

(2) The elimination of the pump for transferring the crumbs from a stripping apparatus to the other one.

(3) The presence of an operation of thermocompression.

With reference to the second cited method already known in the art, it comprises a first indirect heating stage at high pressure followed by a flash which causes the removal of most solvent; for this purpose the pressure drop is remarkable; in the process according to the present invention the heating is direct and in the first stage most solvent is stripped; the pressure difference between the two stages serves the purpose of making the polymer flow spontaneously avoiding thereby the use of transferring means.

The flash occurring in the second stripping apparatus, when already most solvent has been removed, serves the mere purpose of realizing a thermal recovery.

Said differences allow the peculiar advantages in the process according to the present invention; in fact the operative conditions of the two strippers allow the natural flow of the polymer crumbs from a stripper to the other one, avoiding thereby a pumping operation.

This is a fact of particular importance since, in a plant, and in the particular case of cis-polyisoprene, the pumping operation cannot be realized since the polymer, even if containing small amounts of solvent, as the one leaving the first stripper, presents a very high stickiness, so that the crumbs, by agglomerating, clog the pump passages, making impossible the whole stripping process.

Further, owing to the fact that the crumbs pass from a stripper at a higher pressure to a stripper at a lower pressure, it has been possible to introduce a flashing stage which allows to effect a thermal recovery by thermocompression, this positively effecting the plant economy.

By means of the process according to the present invention it is possible to recover polymers from different types of polymer solutions.

Said polymers can be obtained through reactions of monomers of the same type or of monomers of different type, in particular conjugated dienes having from 4 to 8 carbon atoms.

The conjugated dienes which can be used are e.g.: 1,3 butadiene, isoprene, 2,3 dimethylbutadiene, 2 methoxybutadiene, 1,3 hexadiene, 1,3 octadiene and the like.

Said conjugated dienes can be polymerized as such or in mixture with each one of the other and/or with one or more monomers containing the $CH_2=C<$ group.

The comonomers containing said group are: styrene, acrylonitrile, methyl acrylate, methyl methylacrylate, vinyl chloride, ethylene, propylene, butene 1 and the like.

The polymers are prepared in presence of organic solvents comprising: paraffins, cycloparaffins and aromatic hydrocarbons which are comparatively inert and liquid at the operative conditions.

Said solvents are low molecular weight alkanes as propane, butane and pentane; paraffins and cycloparaffins having a higher molecular weight as isooctane, cyclohexane and methylcyclohexane; the aromatic compounds as benzene, toluene and the like.

The process according to the present invention will now be illustrated by the following unrestrictive specification.

Figure 2:
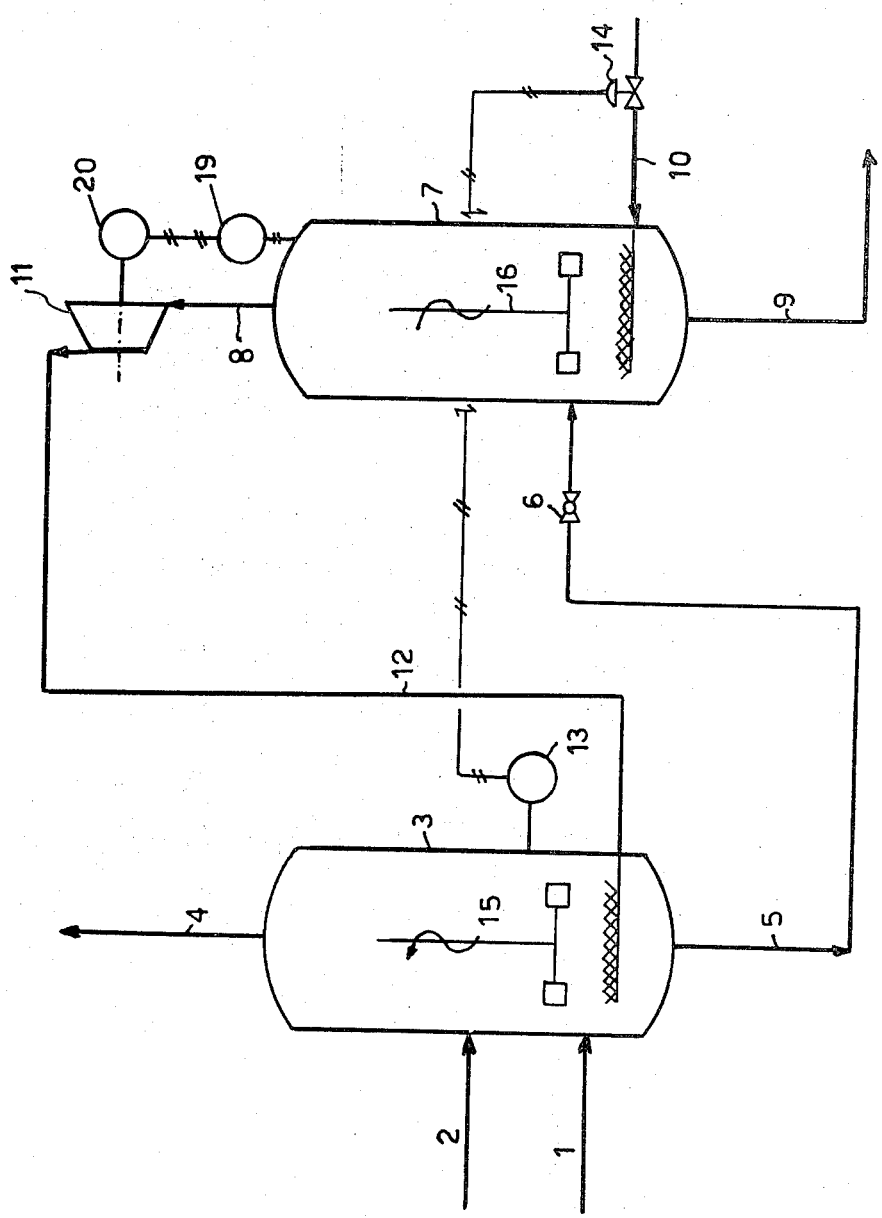

FIGS. 1 and 2 show two possible embodiments of the process according to the present invention: in FIG. 1 steam leaving the second stripper is compressed by means of an ejector; in FIG. 2 the compression is carried out by means of a compressor.

With reference to FIG. 1, the polymeric solution enters, through duct 1, the stripper 3 provided with the stirrer 15; to the stripper 3 through ducts 2 and 12 respectively water and steam are fed; said steam is the one leaving the stripper 7 mixed with live steam coming from the outside.

A stream of steam, solvent and unreacted monomer, wherefrom solvent is recovered, leaves the top of the stripper 3 through 4; a mixture of water, polymer crumbs and of the remaining part of the not removed solvent leaves the bottom.

Owing to the higher pressure existing in the stripper 3 in comparison with the stripper 7, the mixture flows spontaneously and before entering the stripper 7, is subjected to a decompression by passing through the valve 6. In such a way a flash occurs in the stripper 7, provided too with a stirrer 16 and whereto through 10 live steam for the stripping is fed.

From the bottom of 7 through 9, a mixture of water and solvent-free polymer crumbs is discharged; said mixture is fed to the conventional filtration operations; steam with the last traces of solvent leaves the top of the stripper through 8.

Said steam, in one of the two embodiments of the present invention, is compressed in an ejector 11, use being made, as a motive fluid, of live steam coming from the outside through line 17.

In said case the fresh live steam necessary to the stripping is fed in part into the stripper 7 and in part into the stripper 3, acting therefore as a motive fluid.

The steam mixture, leaving the ejector 11, is at the same pressure of the stripper 3 to which said mixture comes through duct 12.

In FIG. 2, 11 indicates a compressor replacing the ejector.

In said case the live steam for the stripping is completely fed into 7 through duct 10.

As far as the instrumentation shown in FIG. 1 is concerned, an organ 13 controlling the temperature inside the stripper 3 regulates by means of the valve 14 the flow of live steam to the stripper 7; in said way the temperature in 3 is regulated at the desired value by means of the steam amount fed into 7.

The organ 19 controlling the pressure, regulates the pressure value inside the stripped 7 by means of the valve 18, changing by means of which the flow of the motive fluid into the ejector 11.

In FIG. 2, the only modifications of the instrumentation are the ones concerning the regulating organ 20 connected to the detecting organ 19. Said element 20 regulates the velocity of the compressor 11, by changing the flow rate leaving the stripper 7.

EXAMPLE

Figure 3:
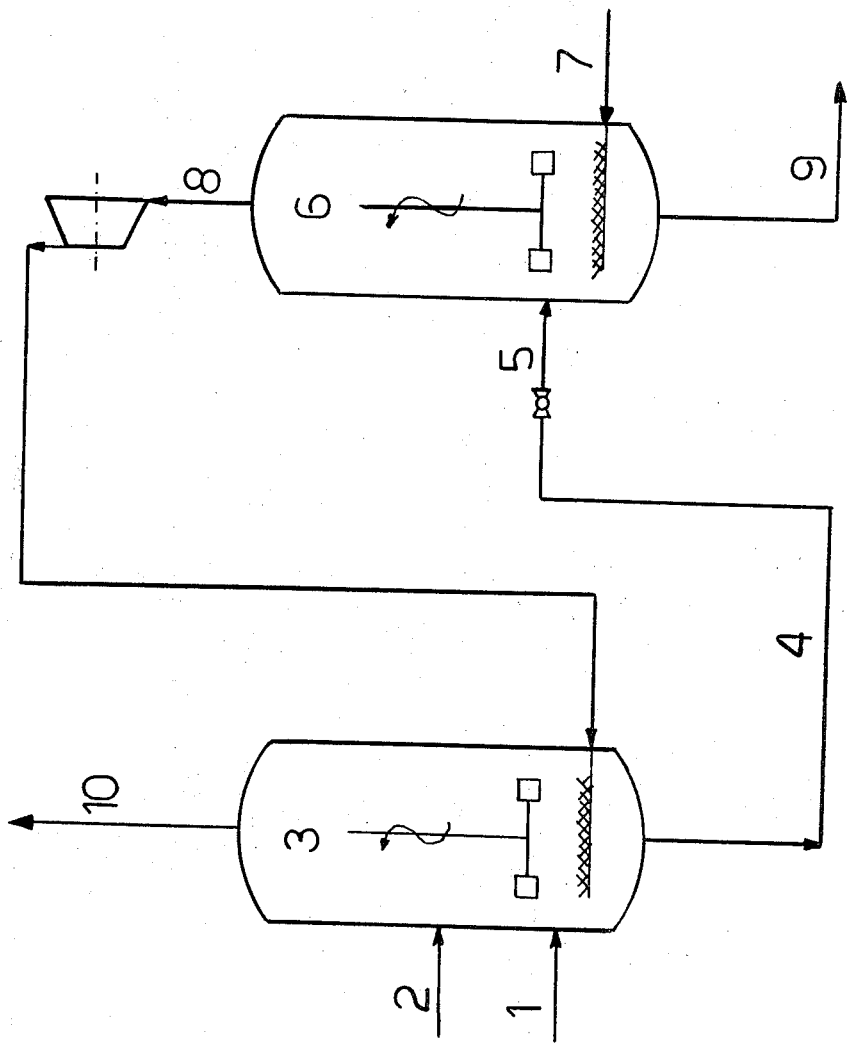

With reference to the scheme of FIG. 3 we are now giving an unrestrictive example of an operation of recovery of polymers from organic solution by means of the process according to the present invention.

| Stream | Fluid | Flow rate, kg./H. | Temp., °C. | P, ata. |
|---|---|---|---|---|
| 1 | Solvent-unreacted monomer | 25,200 | 25 | 2.2 |
|   | Polymer | 3,737 | 25 | 2.2 |
|   | Water | 630 | 25 | 2.2 |
| 2 | Water | 25,820 | 80 | 2.2 |
| 3 |  |  | 106 | 2.2 |
| 4 | Solvent-unreacted monomer | 415 | 106 | 2.2 |
|   | Polymer | 3,737 | 106 | 2.2 |
|   | Water | 33,774 | 106 | 2.2 |
| 5 | Unreacted monomer-solvent | 65 | 99 | 1.2 |
|   | Polymer | 3,737 | 99 | 1.2 |
|   | Water | 33,374 | 99 | 1.2 |
|   | Steam | 400 | 99 | 1.2 |
|   | Solvent vapours-unreacted monomer | 350 | 99 | 1.2 |
| 6 |  |  | 102 | 1.2 |
| 7 | Steam | 15,000 | 180 | 5.5 |
|   | Solvent vapours-unreacted monomer | 396 | 102 | 1.2 |
| 8 | Steam | 15,207 | 102 | 1.2 |
| 9 | Solvent | 19 | 102 | 1.2 |
|   | Polymer | 3,737 | 102 | 1.2 |
|   | Water | 33,567 | 102 | 1.2 |
| 10 | Solvent vapours-unreacted monomer | 25,181 | 106 | 2.2 |
|   | Steam | 7,883 | 106 | 2.2 |

What I claimed is:

1. A process for recovering polymers of conjugated diene monomers from organic solutions characterized in that the polymeric solution to be treated is fed to a first stripper supplying at the same time water and heat by means of steam said first stage being operated at a temperature of between 90 and 150° C. and at absolute pressure between 1 and 5 kg./cm.$^2$; from said first stage a mixture of steam and solvent is discharged as overhead product and a mixture of polymer crumbs, solvent and water as bottom product; said bottom product is subjected to a flashing before its introduction into the second stripper wherein the pressure is lower than the one of the first stripper by 1-2 kg./cm.$^2$ and the temperature is between 80 and 140° C.; from the second stripper, into which live steam is introduced, a mixture of polymer crumbs and water is discharged as bottom product, said mixture being fed to the conventional filtration operations, while as overhead product a mixture of steam and solvent is obtained.

2. Process for recovering polymers from organic solutions, according to claim 1, characterized in that the vapours leaving the second stripper are subjected to a thermocompression before feeding the same to the bottom of the first stripper.

3. Process for recovering polymers from organic solutions, according to claim 1, characterized in that the working pressures of the strippers are decreasing along the flow of the polymer crumbs.

4. Process for recovering polymers from organic solutions, according to claim 1, characterized in that the stream leaving the first stripper, formed of water, polymer and traces of solvent, is subjected to a flashing operation at the inlet of the second stripper.

5. Process for recovering polymers from organic solutions according to claim 1, characterized in that the first stripper works at a temperature between 100 and 130° C. and at an absolute pressure between 2 and 3.2 kg./cm.$^2$.

6. Process for recovering polymers from organic solutions according to claim 1 characterized in that the second stripper works at a temperature between 100 and 120° C.

7. Process for recovering polymers from organic solutions according to claim 1 characterized in that the thermocompression operation can be carried out either by means of an ejector or by means of a compressor; in the first case the steam necessary to the stripping operation is fed in part to the second stripper and in part to the first one, acting in said way also as a motive fluid.

References Cited

UNITED STATES PATENTS 3,076,795   2/1963   Hall _____ 260—94.7
3,250,313   5/1966   Irvin _____ 159—47

JOSEPH L. SCHOFER, Primary Examiner

W. F. HAMROCK, Assistant Examiner

U.S. Cl. X.R.

260—82.1, 85.1, 96 R